ured l UNITED STATES PATENT OFFICE.

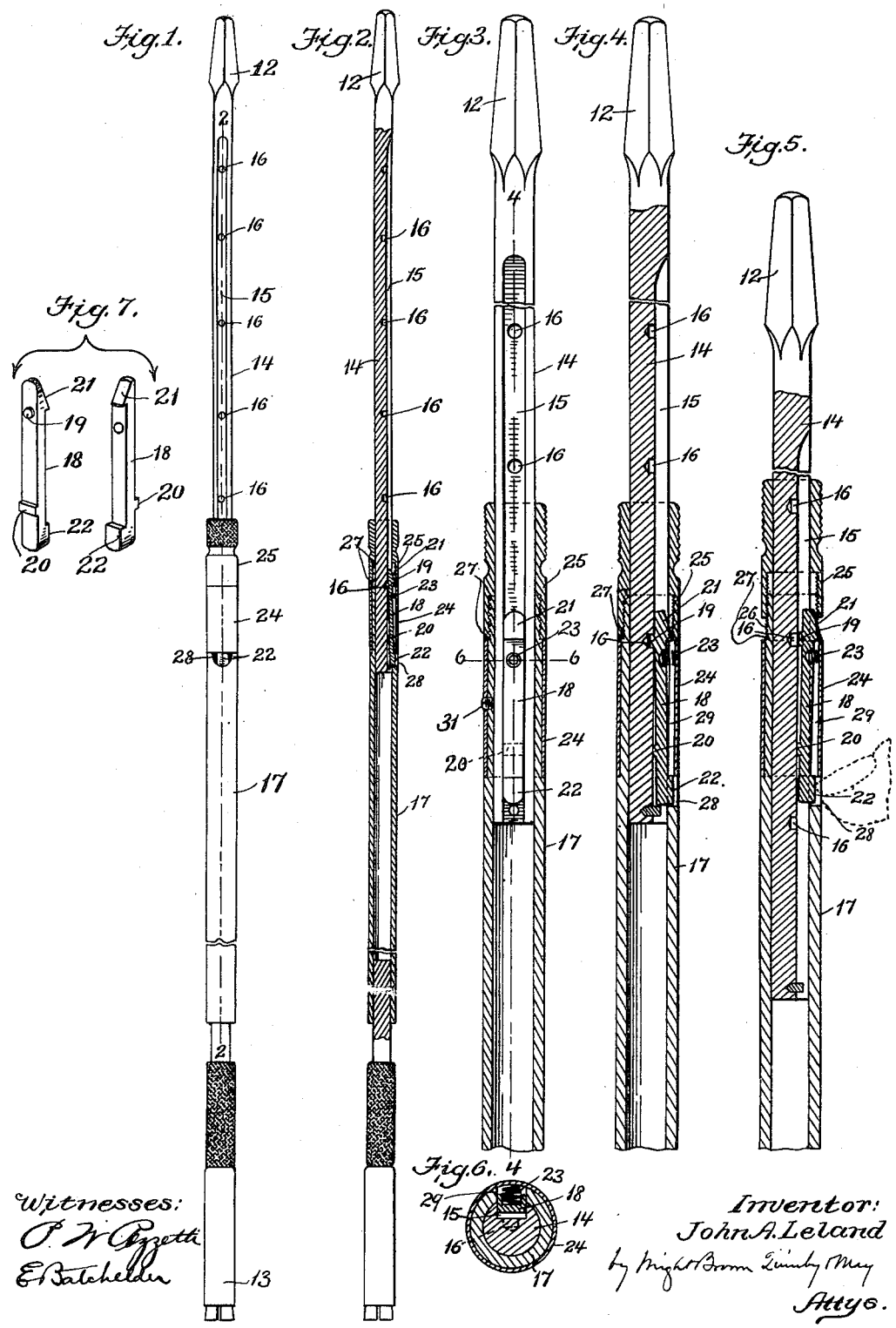

JOHN A. LELAND, OF MONTAGUE, MASSACHUSETTS, ASSIGNOR TO MILLERS FALLS COMPANY, OF MILLERS FALLS, MASSACHUSETTS, A CORPORATION OF MASSACHUSETTS.

TELESCOPIC EXTENSION-ROD.

1,030,592.

Specification of Letters Patent.

Patented June 25, 1912.

Application filed March 9, 1912. Serial No. 682,948.

*To all whom it may concern:*

Be it known that I, JOHN A. LELAND, a citizen of the United States, and a resident of Montague, in the county of Franklin and State of Massachusetts, have invented certain new and useful Improvements in Telescopic Extension-Rods, of which the following is a specification.

This invention relates to telescopic rods or shafts employed for communicating rotary motion from a driving part or motor engaged with one end of the rod to a driven part engaged with the opposite end and it has for its object to provide improved means for adjustably connecting the members of a telescopic rod or shaft in such manner that the distance between the driving part or motor and the driven part may be varied to a considerable extent an operative connection being maintained between the members so that one is rotated by the other under all adjustments.

The invention as here shown is embodied in a bit extension of telescopic construction and having at one end a brace chuck-engaging shank, and at the other end a bit-engaging chuck, said shank and chuck being carried by members which are slidable relatively to each other to increase or diminish the distance between the shank and chuck, automatically engaging devices being provided whereby the extension members may be locked together at any desired adjustment, and the said devices being manually separable to enable the members to be disconnected and adjusted relatively to each other.

The invention consists in the improvements which I will now proceed to describe and claim.

Of the accompanying drawings:—Figure 1 reprsents a side elevation of an extension rod embodying my invention. Fig. 2 represents a longitudinal section of the same. Fig. 3 represents an enlargement of a portion of Fig. 1, the tubular member being shown in section and the movable clutch part engaged therewith in elevation. Fig. 4 repesents a section on line 4—4 of Fig. 3, showing the rod members locked together. Fig. 5 represents a view similar to Fig. 4 showing the rod members unlocked. Fig. 6 represents a section on line 6—6 of Fig. 3. Fig. 7 represents in different perspective views the movable clutch part hereinafter referred to.

The same reference characters indicate the same parts in all the figures.

In the embodiment of my invention shown for purposes of illustration my improved telescopic extension rod is provided at one end with a shank 12 adapted to engage a bit brace chuck whereby the rod may be rotated, and at the other end with a bit engaging chuck 13. Said chuck as here shown is constructed as shown by Letters Patent of the United States, No. 929,231, dated July 27, 1909.

The body portion of the extension rod is composed of two telescopic members, one carrying the shank 12 and the other the chuck 13, said members being slidable relatively to each other to increase or decrease the distance between the said shank and chuck. In this embodiment of my invention the member 14 is an elongated rod provided with a longitudinal groove 15. In the bottom of said groove are formed numerous shallow recesses 16 drilled in the bottom of the groove and uniformly spaced apart. The other member 17 of the extension rod is tubular and has a sliding fit on the member 14. The tubular member 17 is provided with a movable clutch part adapted to engage any of the recesses 16. Said movable clutch part in this embodiment of my invention includes as a whole a lever 18 formed to enter the groove 15 and provided with a clutch projection 19 adapted to enter any of the recesses 16, and with a projection 20 adapted to bear on the bottom of the groove 15 and constitute a fulcrum for the lever, the clutch projection 19 being formed on the inner side of one arm of the lever, and the outer side of said arm being provided with an inclined face 21. The other arm of the lever is provided with a push piece 22 adapted to be manually operated by pressure against it of a thumb nail, or other instrumentality, to tilt the lever, as indicated by Fig. 5. The lever 18 is inserted in the groove 15 with the fulcrum projection 20 bearing on the bottom of the groove. A spring 23 interposed between the arm of the lever which carries the clutch projection 19 and a sleeve 24 attached to and forming a part of the tubular member 17, normally presses the clutch projection 19 into engagement with any recess 16 which coincides therewith, as shown by Fig. 4.

The tubular member 17 is provided with an adjustable sleeve 25 which has an internally screw-threaded portion engaging an externally threaded portion 26 of the tubular member 17, the sleeve 25 being adjustable lengthwise of the tubular member by rotation thereof. When the sleeve 25 is adjusted so that its outer end bears on a shoulder 27 formed on the tubular member, it bears on the inclined face 21 and locks the clutch projection 19 in its projected position, said projection being engaged with one of the recesses 16, as shown by Fig. 4. When the sleeve 25 is adjusted away from the shoulder 27, as shown by Fig. 5, it is sufficiently removed from the highest part of the inclined face 21 to permit the lever 18 to be tilted by pressure of a thumb nail or other instrumentality against the push piece 22, as indicated by Fig. 5, the clutch projection 19 being thus withdrawn from locking engagement with the member 14, so that either member may be moved lengthwise relatively to the other to increase or diminish the length of the extension rod.

The member 17 is provided with an opening 28 exposing the push piece 22 so that said push piece may be pressed inwardly in the manner indicated by Fig. 5. When the pressure on the push piece is removed, the spring 23 presses the clutch projection 19 inwardly and causes it to interlock with a recess 16 moved into coincidence therewith, the clutch projection being locked in its projected position by adjusting the sleeve 25 to the position shown by Fig. 4.

The tubular member 17 is provided with a slot 29, Figs. 4 and 6, formed to permit the insertion and removal of the lever 18. The greater portion of said slot is covered by the thin sleeve 24 attached to the member 17 by a screw 31, said sleeve forming a bearing for the outer end of the spring 23. The sleeve 24 is shorter than the slot 29 so that one end portion of said slot is uncovered and forms the opening 28 through which the push piece 22 is exposed.

From the foregoing it will be seen that the members 14 and 17 may be securely locked together with the shank 12 and chuck 13 at various distances apart, and that the members may be released from their locking interengagement by first adjusting the sleeve 25 to the position shown by Fig. 5 and then pressing the push piece 22 inwardly. When the members have been adjusted to the desired length, the spring 23 projects the clutch projection 19 into the coinciding fixed recess 16, the movable clutch part being then locked by returning the sleeve 25 to the position shown by Fig. 4.

The sides of the lever 18 abut against the sides of the slot 29 of the tubular member.

The movable clutch part which includes said lever is therefore so engaged with the tubular member that it imparts rotary motion from the grooved member to the tubular member, the edges of the lever 18 and the edges of the slot 29 constituting complemental clutch parts for this purpose. The movable clutch part therefore serves to lock the two members of the extension rod together at any desired longitudinal adjustment, and to impart rotary motion from one member to the other.

It is obvious that the described extension rod is not limited to use as a bit extension and may be used for other purposes.

I claim:—

1. A telescopic extension rod comprising a member having a longitudinal groove and a plurality of recesses at the bottom of said groove, a tubular member slidingly engaged with the grooved member, a complemental movable clutch part movably engaged with the tubular member and composed of a tilting lever fulcrumed in said groove and provided on one arm with an inclined face and with a clutch projection which is yieldingly projected into locking engagement with a recess in the grooved member, the opposite arm of the lever being provided with a push piece whereby the clutch projection may be manually retracted, and a longitudinally adjustable sleeve on the tubular member adapted to coöperate with said inclined face in locking and unlocking the clutch projection.

2. A telescopic extension rod comprising a longitudinally grooved member having a plurality of recesses at the bottom of its groove, a tubular member slidably engaged with the grooved member and having a longitudinal slot, a tilting lever fulcrumed in said groove and engaged with the sides of said slot, said lever being provided on one arm with a clutch projection and with an inclined face, and on the other arm with a push piece occupying one end of said slot, a casing sleeve covering portions of said slot and lever, a spring interposed between the casing sleeve and the lever and adapted to press the clutch projection into engagement with a recess in the grooved member, and a longitudinally adjustable sleeve engaged with the tubular member and adapted to coöperate with said inclined face in locking and unlocking the clutch projection.

In testimony whereof I have affixed my signature, in presence of two witnesses.

JOHN A. LELAND.

Witnesses:
 KATHERINE E. NICHOLS,
 LIZZIE B. STRACHAN.